(12) United States Patent
Miller et al.

(10) Patent No.: US 10,759,281 B2
(45) Date of Patent: Sep. 1, 2020

(54) CONTROLLING OPERATION OF ELECTRIFIED VEHICLE TRAVELLING ON INDUCTIVE ROADWAY TO INFLUENCE ELECTRICAL GRID

(71) Applicant: FORD GLOBAL TECHNOLOGIES, LLC, Dearborn, MI (US)

(72) Inventors: Kenneth James Miller, Canton, MI (US); Douglas Raymond Martin, Canton, MI (US); Jimmy Kapadia, Ottawa Hills, OH (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 665 days.

(21) Appl. No.: 15/000,298

(22) Filed: Jan. 19, 2016

(65) Prior Publication Data

US 2017/0203655 A1    Jul. 20, 2017

(51) Int. Cl.

| B60L 1/00 | (2006.01) |
|---|---|
| B60L 11/18 | (2006.01) |
| B60L 5/40 | (2006.01) |
| B60L 5/00 | (2006.01) |
| H02J 7/14 | (2006.01) |
| H02J 7/02 | (2016.01) |
| B60L 53/63 | (2019.01) |
| B60L 55/00 | (2019.01) |
| B60L 58/12 | (2019.01) |
| B60L 53/30 | (2019.01) |
| B60L 53/12 | (2019.01) |
| H02J 3/28 | (2006.01) |

(52) U.S. Cl.
CPC ............ *B60L 11/182* (2013.01); *B60L 5/005* (2013.01); *B60L 5/40* (2013.01); *B60L 53/12* (2019.02); *B60L 53/32* (2019.02); *B60L 53/63* (2019.02); *B60L 55/00* (2019.02); *B60L 58/12* (2019.02); *H02J 7/025* (2013.01); *H02J 7/1438* (2013.01); *H02J 3/28* (2013.01); *Y02E 60/721* (2013.01); *Y02T 10/705* (2013.01); *Y02T 10/7005* (2013.01); *Y02T 10/7044* (2013.01); *Y02T 10/7072* (2013.01); *Y02T 90/121* (2013.01); *Y02T 90/122* (2013.01); *Y02T 90/128* (2013.01); *Y02T 90/14* (2013.01); *Y02T 90/163* (2013.01); *Y04S 10/126* (2013.01)

(58) Field of Classification Search
None
See application file for complete search history.

(56) References Cited

U.S. PATENT DOCUMENTS

| 5,572,670 A | * | 11/1996 | Puckett | ................ G06F 11/321 |
|---|---|---|---|---|
| | | | | 714/46 |
| 5,573,090 A | * | 11/1996 | Ross | ...................... B60L 5/005 |
| | | | | 191/10 |

(Continued)

*Primary Examiner* — Bhavesh V Amin
(74) *Attorney, Agent, or Firm* — David B. Kelley; Carlson, Gaskey & Olds

(57) ABSTRACT

A method for balancing electrical grid production with electrical grid demand according to an exemplary aspect of the present disclosure includes, among other things, controlling an electrified vehicle prior to and during an inductive roadway event to either conserve a state of charge of a battery pack in response to a first grid condition of an electrical grid or deplete the state of charge of the battery pack in response to a second grid condition of the electrical grid.

25 Claims, 5 Drawing Sheets

(56) References Cited

U.S. PATENT DOCUMENTS

| | | | | |
|---|---|---|---|---|
| 5,680,048 A * | 10/1997 | Wollny | .................... | F41H 11/12 324/329 |
| 5,821,731 A * | 10/1998 | Kuki | .................... | H02J 7/0045 320/108 |
| 6,795,786 B2 * | 9/2004 | LaMarca | ................ | G01D 9/005 700/217 |
| 7,103,448 B2 * | 9/2006 | Kato | ......................... | B25J 9/08 318/601 |
| 7,849,944 B2 | 12/2010 | DeVault | | |
| 7,928,693 B2 * | 4/2011 | Hafner | .................. | B60L 3/0046 320/132 |
| 8,487,480 B1 * | 7/2013 | Kesler | ................... | B60L 11/007 307/104 |
| 8,763,773 B2 * | 7/2014 | Asplund | ................... | B60L 5/40 191/22 C |
| 8,849,997 B2 * | 9/2014 | Okuno | ................... | H04L 43/00 709/217 |
| 8,884,581 B2 * | 11/2014 | Widmer | ................ | B60L 11/182 320/108 |
| 8,933,594 B2 * | 1/2015 | Kurs | ....................... | B60L 3/003 307/326 |
| 8,946,938 B2 * | 2/2015 | Kesler | .................. | B60L 11/182 307/104 |
| 8,957,549 B2 * | 2/2015 | Kesler | ..................... | H03H 7/40 307/104 |
| 9,035,486 B2 * | 5/2015 | Asplund | ................... | B60L 5/40 307/10.1 |
| 9,077,194 B2 * | 7/2015 | Covic | ..................... | H02J 5/005 |
| 9,142,990 B2 * | 9/2015 | Keeling | ................ | B60L 11/182 |
| 9,352,661 B2 * | 5/2016 | Keeling | ............. | B60L 11/1829 |
| 9,368,274 B2 * | 6/2016 | Xu | ........................ | A01K 11/006 |
| 9,511,674 B2 * | 12/2016 | Keeling | .................. | B60M 1/36 |
| 9,513,628 B2 * | 12/2016 | Crepet | .................... | G05B 23/02 |
| 9,666,357 B2 * | 5/2017 | Keeling | .................. | H02J 50/12 |
| 9,726,518 B2 * | 8/2017 | Widmer | ................ | G01D 5/2006 |
| 9,735,605 B2 * | 8/2017 | Garcia Briz | ............ | H02J 5/005 |
| 9,772,401 B2 * | 9/2017 | Widmer | .................. | G01S 13/04 |
| 9,804,623 B2 * | 10/2017 | Ansari | ....................... | G05F 1/66 |
| 2004/0236466 A1 * | 11/2004 | Ota | ......................... | G08B 17/10 700/245 |
| 2006/0184467 A1 * | 8/2006 | Nagashima | .............. | G06N 3/02 706/15 |
| 2007/0278993 A1 * | 12/2007 | Vogel | .................... | B23K 9/1081 320/107 |
| 2007/0282495 A1 * | 12/2007 | Kempton | .................. | B60L 8/00 701/22 |
| 2008/0244329 A1 * | 10/2008 | Shinbo | .................... | G06F 11/24 714/45 |
| 2008/0308328 A1 | 12/2008 | Kejha | | |
| 2009/0012916 A1 * | 1/2009 | Barnett | ................... | G06Q 50/06 705/412 |
| 2009/0045773 A1 * | 2/2009 | Pandya | .................. | B60L 5/005 320/108 |
| 2009/0091291 A1 * | 4/2009 | Woody | ..................... | B60K 6/48 320/109 |
| 2009/0096413 A1 * | 4/2009 | Partovi | ................... | H01F 5/003 320/108 |
| 2009/0103341 A1 * | 4/2009 | Lee | ........................ | B60W 10/26 363/124 |
| 2009/0229900 A1 * | 9/2009 | Hafner | .................. | B60L 3/0046 180/65.275 |
| 2009/0259340 A1 * | 10/2009 | Umemoto | ............ | A61B 1/0051 700/275 |
| 2009/0295577 A1 * | 12/2009 | Yamaguchi | ............ | G01S 17/026 340/541 |
| 2010/0117596 A1 * | 5/2010 | Cook | ...................... | H01Q 1/2225 320/108 |
| 2010/0174629 A1 * | 7/2010 | Taylor | .................. | G06Q 20/10 705/34 |
| 2010/0277121 A1 * | 11/2010 | Hall | ...................... | B60L 11/182 320/108 |
| 2011/0022222 A1 * | 1/2011 | Tonegawa | ............... | B60L 8/003 700/232 |
| 2011/0047052 A1 * | 2/2011 | Cornish | .................. | G06Q 10/06 705/30 |
| 2011/0163542 A1 * | 7/2011 | Farkas | ..................... | B60L 58/40 290/2 |
| 2011/0166731 A1 | 7/2011 | Kristinsson et al. | | |
| 2011/0175569 A1 * | 7/2011 | Austin | .................. | H01M 10/44 320/109 |
| 2011/0204720 A1 * | 8/2011 | Ruiz | ....................... | G06Q 50/06 307/66 |
| 2011/0245987 A1 * | 10/2011 | Pratt | ...................... | H01M 10/44 700/295 |
| 2011/0254377 A1 * | 10/2011 | Wildmer | ............... | B60L 11/182 307/104 |
| 2011/0254503 A1 * | 10/2011 | Widmer | ................ | B60L 3/0069 320/108 |
| 2011/0285349 A1 * | 11/2011 | Widmer | ................ | B60L 11/182 320/108 |
| 2011/0302078 A1 * | 12/2011 | Failing | ..................... | B60L 3/00 705/39 |
| 2012/0086397 A1 * | 4/2012 | Obayashi | .................. | H02J 3/32 320/109 |
| 2012/0112531 A1 * | 5/2012 | Kesler | ..................... | H02J 5/005 307/9.1 |
| 2012/0123709 A1 * | 5/2012 | Chen | ................... | B60L 11/1848 702/60 |
| 2012/0146578 A1 * | 6/2012 | Krestel | ................. | B60M 7/003 320/108 |
| 2012/0153894 A1 * | 6/2012 | Widmer | ............... | H04B 5/0037 320/108 |
| 2012/0161530 A1 * | 6/2012 | Urano | ..................... | H02J 7/025 307/104 |
| 2012/0173185 A1 * | 7/2012 | Taylor | .................. | G01B 11/026 702/104 |
| 2012/0200151 A1 * | 8/2012 | Obayashi | .................. | B60L 53/65 307/9.1 |
| 2012/0233062 A1 * | 9/2012 | Cornish | .................... | B25J 11/00 705/39 |
| 2012/0262002 A1 * | 10/2012 | Widmer | .................. | B60L 53/65 307/104 |
| 2012/0286723 A1 * | 11/2012 | Ukita | ............... | G06Q 10/06312 320/107 |
| 2012/0313742 A1 * | 12/2012 | Kurs | ..................... | B60L 11/182 336/180 |
| 2013/0020162 A1 * | 1/2013 | Asplund | .................... | B60L 5/42 191/49 |
| 2013/0020163 A1 * | 1/2013 | Asplund | ............... | B60L 3/0046 191/22 C |
| 2013/0020165 A1 * | 1/2013 | Asplund | .................. | B60L 5/40 191/29 R |
| 2013/0020862 A1 * | 1/2013 | Miller | .................... | H02J 5/005 307/9.1 |
| 2013/0020866 A1 * | 1/2013 | Asplund | .................. | B60L 5/40 307/9.1 |
| 2013/0049674 A1 * | 2/2013 | Davis | .................... | H02J 7/0027 320/101 |
| 2013/0067253 A1 * | 3/2013 | Tsuda | ..................... | B60L 8/003 713/300 |
| 2013/0103191 A1 * | 4/2013 | Bouman | ................. | B60L 53/14 700/244 |
| 2013/0154553 A1 * | 6/2013 | Steele | ..................... | B60M 7/003 320/108 |
| 2013/0204471 A1 * | 8/2013 | O'Connell | ............. | H02J 3/008 701/22 |
| 2013/0207482 A1 * | 8/2013 | Madawala | ............. | H02J 7/025 307/104 |
| 2013/0214706 A1 * | 8/2013 | Flomenhoft | ............ | B60L 53/12 318/139 |
| 2013/0241485 A1 * | 9/2013 | Snyder | .................... | B60L 58/15 320/109 |
| 2013/0293025 A1 * | 11/2013 | Xu | ........................ | H02J 17/00 307/104 |
| 2013/0328387 A1 * | 12/2013 | Venkateswaran | ....... | B60L 50/66 307/9.1 |

(56) References Cited

U.S. PATENT DOCUMENTS

| | | | |
|---|---|---|---|
| 2013/0334892 A1* | 12/2013 | Hall | H01F 38/14 307/104 |
| 2014/0015329 A1* | 1/2014 | Widmer | B60L 53/63 307/104 |
| 2014/0081563 A1 | 3/2014 | Wang et al. | |
| 2014/0125140 A1* | 5/2014 | Widmer | H02J 7/025 307/104 |
| 2014/0197787 A1* | 7/2014 | Mashinsky | B60L 11/182 320/108 |
| 2014/0266004 A1* | 9/2014 | Andrews, Jr. | B60L 53/55 320/104 |
| 2014/0327391 A1* | 11/2014 | Niederhauser | B60L 11/182 320/108 |
| 2015/0097512 A1* | 4/2015 | Li | B60L 58/13 320/101 |
| 2015/0170833 A1* | 6/2015 | Widmer | H01F 38/14 307/104 |
| 2015/0246614 A1* | 9/2015 | Dames | B60L 5/005 191/10 |
| 2015/0260835 A1* | 9/2015 | Widmer | G01S 13/04 342/27 |
| 2015/0270719 A1* | 9/2015 | Kurs | H02J 5/005 320/108 |
| 2015/0298559 A1* | 10/2015 | Keeling | B60M 1/36 320/108 |
| 2015/0298560 A1* | 10/2015 | Keeling | B60L 53/12 191/10 |
| 2015/0298561 A1* | 10/2015 | Keeling | B60L 53/12 191/10 |
| 2015/0303714 A1* | 10/2015 | Keeling | H02J 7/0052 320/108 |
| 2015/0364944 A1* | 12/2015 | Garcia Briz | H02J 5/005 307/104 |
| 2016/0016479 A1* | 1/2016 | Khaligh | B60L 11/1812 363/17 |
| 2016/0023557 A1* | 1/2016 | Dimke | B60L 5/42 320/108 |
| 2016/0025821 A1* | 1/2016 | Widmer | G01R 33/0047 324/258 |
| 2016/0036917 A1* | 2/2016 | Koravadi | G01C 21/3415 701/2 |
| 2016/0068069 A1* | 3/2016 | Percebon | B60L 11/182 307/104 |
| 2016/0214257 A1* | 7/2016 | Sejimo | B25J 13/08 |
| 2017/0028854 A1* | 2/2017 | Lee | B60L 11/182 |
| 2017/0120758 A1* | 5/2017 | Xu | H02J 7/0004 |
| 2017/0136889 A1* | 5/2017 | Ricci | B60L 11/182 |
| 2017/0136908 A1* | 5/2017 | Ricci | B60L 11/1831 |
| 2017/0136911 A1* | 5/2017 | Ricci | B60L 58/12 |
| 2017/0140349 A1* | 5/2017 | Ricci | G06Q 20/102 |
| 2017/0166070 A1* | 6/2017 | Dunger | B60L 11/1818 |
| 2017/0203655 A1* | 7/2017 | Miller | B60L 11/182 |

* cited by examiner

CONTROLLING OPERATION OF ELECTRIFIED VEHICLE TRAVELLING ON INDUCTIVE ROADWAY TO INFLUENCE ELECTRICAL GRID

TECHNICAL FIELD

This disclosure relates to a vehicle system and method for an electrified vehicle. The vehicle system is adapted to adjust operation of an electrified vehicle in a manner that assists in balancing the energy production of an electrical grid with the energy demand from the electrical grid while the vehicle is traveling on an inductive roadway.

BACKGROUND

The need to reduce automotive fuel consumption and emissions is well known. Therefore, vehicles are being developed that reduce reliance on internal combustion engines. Electrified vehicles are one type of vehicle currently being developed for this purpose. In general, electrified vehicles differ from conventional motor vehicles because they are selectively driven by one or more battery powered electric machines and may have additional power sources such as an internal combustion engine. Conventional motor vehicles, by contrast, rely exclusively on the internal combustion engine to drive the vehicle.

A high voltage battery pack typically powers the electric machines and other electrical loads of the electrified vehicle. The battery pack includes a plurality of battery cells that must be periodically recharged. The energy necessary for recharging the battery cells is commonly sourced from an electrical grid. The electrical grid includes an interconnected network of generating stations (coal, gas, nuclear, chemical, hydro, solar, wind, etc.), demand centers and transmission lines that produce and deliver electrical power to consumers. Energy production of the electrical grid must be constantly balanced against the energy demand from the consumers.

SUMMARY

A method for balancing electrical grid production with electrical grid demand according to an exemplary aspect of the present disclosure includes, among other things, controlling an electrified vehicle prior to and during an inductive roadway event to either conserve a state of charge of a battery pack in response to a first grid condition of an electrical grid or deplete the state of charge of the battery pack in response to a second grid condition of the electrical grid.

In a further non-limiting embodiment of the foregoing method, the first grid condition is an energy shortage of the electrical grid and the second grid condition is an energy surplus of the electrical grid.

In a further non-limiting embodiment of either of the foregoing methods, the method includes adding power from the battery pack to the electrical grid during the inductive roadway event if the electrical grid has the energy shortage.

In a further non-limiting embodiment of any of the foregoing methods, the method includes accepting power from the electrical grid to charge the battery pack during the inductive roadway event if the electrical grid has the energy surplus.

In a further non-limiting embodiment of any of the foregoing methods, the inductive roadway event occurs when the electrified vehicle is travelling along an inductive roadway.

In a further non-limiting embodiment of any of the foregoing methods, the controlling step includes calculating an amount of power needed to meet an electrical need of the electrical grid based on whether the electrical grid anticipates an electrical shortage or an electrical surplus.

In a further non-limiting embodiment of any of the foregoing methods, the method includes confirming whether a wireless grid signal has been received by the electrified vehicle from the electrical grid.

In a further non-limiting embodiment of any of the foregoing methods, the method includes determining whether the wireless grid signal indicates an energy shortage or an energy surplus.

In a further non-limiting embodiment of any of the foregoing methods, if the wireless grid signal indicates an energy shortage, the controlling step includes increasing a power output of a power source or increasing a run time of the power source during the inductive roadway event.

In a further non-limiting embodiment of any of the foregoing methods, the method includes adding energy from the battery pack to the inductive roadway and then from the inductive roadway to the electrical grid to address the energy shortage.

In a further non-limiting embodiment of any of the foregoing methods, if the wireless grid signal indicates an energy surplus, the controlling step includes decreasing a power output of a power source or decreasing a run time of the power source during the inductive roadway event.

In a further non-limiting embodiment of any of the foregoing methods, the method includes delivering power from the electrical grid to the inductive roadway and then from the inductive roadway to the electrified vehicle to charge the battery pack during the inductive roadway event.

In a further non-limiting embodiment of any of the foregoing methods, the method includes actuating a power source ON during the inductive roadway event in response to an energy shortage condition of the electrical grid.

In a further non-limiting embodiment of any of the foregoing methods, the method includes decreasing a power output of a power source or decreasing a run time of the power source during the inductive roadway event in response to an energy surplus condition of the electrical grid.

In a further non-limiting embodiment of any of the foregoing methods, the controlling step includes controlling an inductive charging system of the electrified vehicle to either send electrical energy to the inductive roadway or accept electrical energy from the inductive roadway.

An electrified vehicle according to another exemplary aspect of the present disclosure includes, among other things, a set of drive wheels, a power source configured to selectively power the drive wheels, a battery pack configured to selectively power the drive wheels and a control system configured with instructions for adjusting operation of the power source while traveling on an inductive roadway in a manner that influences an electrical grid.

In a further non-limiting embodiment of the foregoing electrified vehicle, the control system is configured to receive a wireless grid signal from the electrical grid, the wireless grid signal including the instructions.

In a further non-limiting embodiment of either of the foregoing electrified vehicles, an inductive charging system is configured to either send electrical energy to the inductive roadway or receive electrical energy from the inductive roadway.

In a further non-limiting embodiment of any of the foregoing electrified vehicles, the control system is configured to run the power source during an energy shortage condition of the electrical grid and restrict operation of the power source during an energy surplus condition of the electrical grid.

In a further non-limiting embodiment of any of the foregoing electrified vehicles, the power source is an engine or a fuel cell.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes a vehicle system for controlling an electrified vehicle during an inductive roadway event to balance an electrical grid. Inductive roadway events occur, for example, when the electrified vehicle is traveling along an inductive roadway. An exemplary vehicle control strategy includes controlling a power source (e.g., an engine, fuel cell etc.) of the electrified vehicle in a manner that either conserves a state of charge (SOC) of a battery pack or depletes the SOC of the battery pack during the inductive roadway event. In some embodiments, if the electrical grid has an energy shortage, the power source of the electrified vehicle is turned ON more frequently or the power output of the power source is increased to a level greater than that necessary to drive the vehicle during the inductive roadway event. The battery pack SOC is therefore either conserved or increased during the inductive roadway event for later adding energy to the electrical grid. In other embodiments, operation of the power source of the electrified vehicle is restricted during the inductive roadway event if the electrical grid has an energy surplus. The battery pack SOC is therefore depleted during the inductive roadway event and can be replenished by accepting energy from the electrical grid. These and other features are discussed in greater detail in the following paragraphs of this detailed description.

Figure 1:
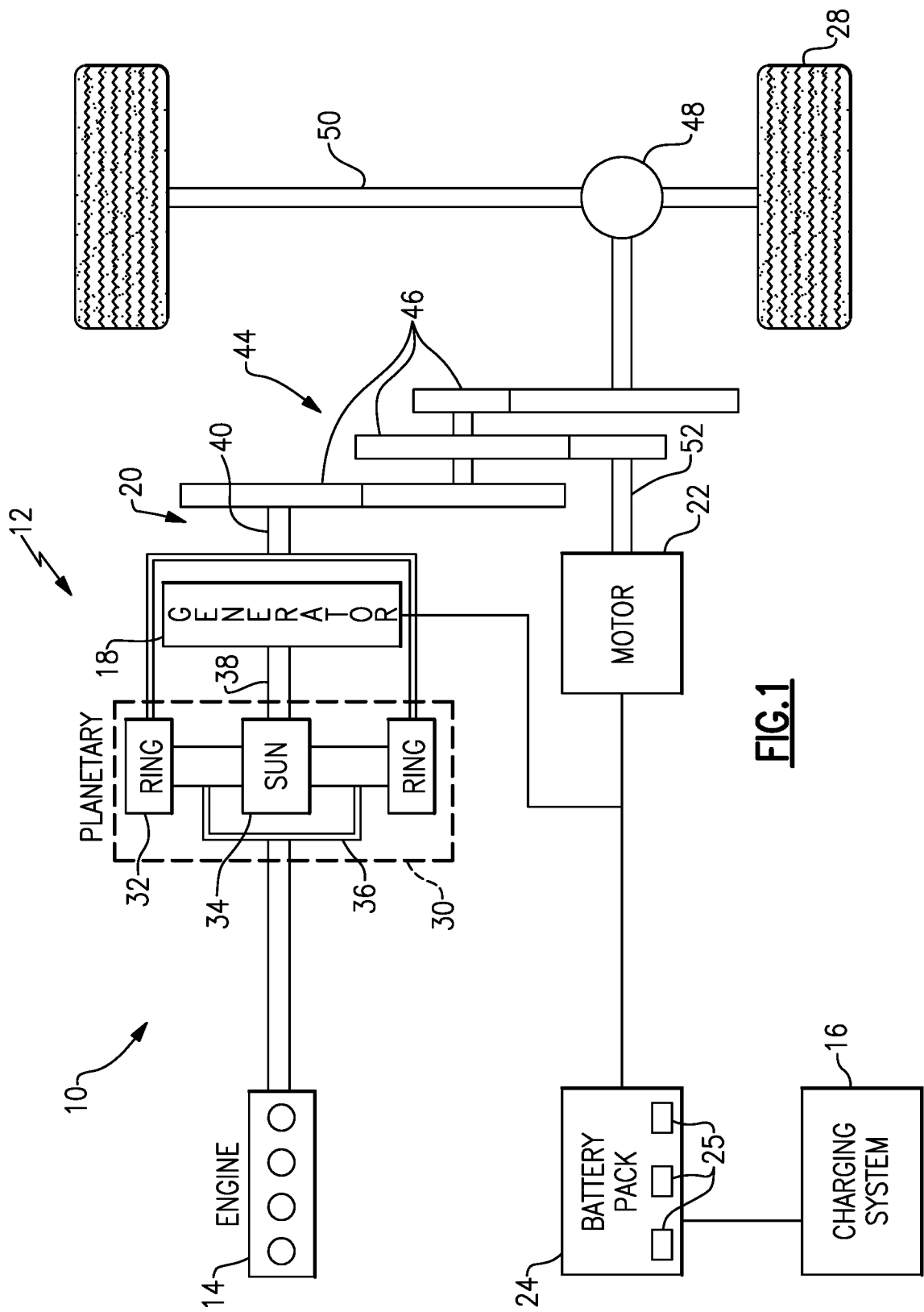
FIG. 1 schematically illustrates a powertrain of an electrified vehicle.

FIG. 1 schematically illustrates a powertrain 10 of an electrified vehicle 12. In one non-limiting embodiment, the electrified vehicle 12 is a hybrid electric vehicle (HEV). In another non-limiting embodiment, the electrified vehicle 12 is a fuel cell vehicle. In yet another non-limiting embodiment, the electrified vehicle 12 is an electric train. Other electrified vehicles, including any vehicle capable of generating electrical energy and sending it to the grid, could also benefit from the teachings of this disclosure.

In one non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine) and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28. In one embodiment, the power transfer units 30, 44 are part of a transaxle 20 of the electrified vehicle 12.

The motor 22 can also be employed to drive the vehicle drive wheels 28 by outputting torque to a shaft 52 that is also connected to the second power transfer unit 44. In one embodiment, the motor 22 is part of a regenerative braking system. For example, the motor 22 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices can also be used to electrically power the electrified vehicle 12.

In one non-limiting embodiment, the electrified vehicle 12 has at least two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

The electrified vehicle 12 may also include a charging system 16 for charging the energy storage devices (e.g., battery cells) of the battery pack 24. The charging system 16 may be connected to an external power source (not shown) for receiving and distributing power throughout the vehicle. The charging system 16 may also be equipped with power electronics used to convert AC power received from the external power supply to DC power for charging the energy storage devices of the battery pack 24. The charging system 16 may also accommodate one or more conventional voltage sources from the external power supply (e.g., 110 volt, 220 volt, etc.). In yet another non-limiting embodiment, the charging system 16 is an inductive charging system.

The powertrain 10 shown in FIG. 1 is highly schematic and is not intended to limit this disclosure. Various additional components could alternatively or additionally be employed by the powertrain 10 within the scope of this disclosure.

Figure 2:
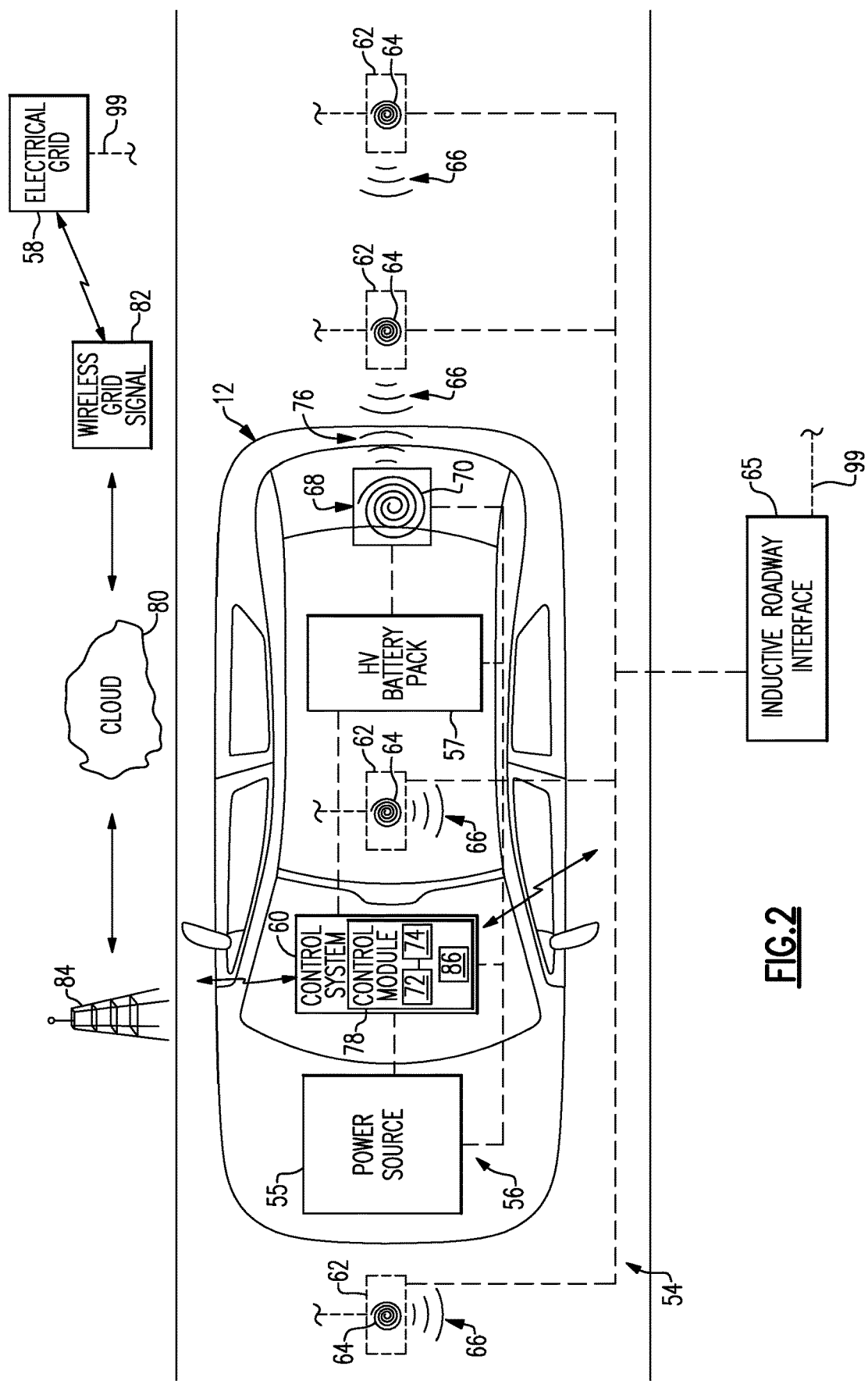
FIG. 2 illustrates a vehicle system of an electrified vehicle.

FIG. 2 is a highly schematic depiction of an electrified vehicle 12 traveling along an inductive roadway 54. The inductive roadway 54 includes a network of interconnected charging modules 62 that may be embedded inside the inductive roadway 54 or fixated overhead of the inductive roadway 54, for example. The charging modules 62 are connected to and thus powered by an electrical grid 58 (shown schematically at connection 99). Each charging module 62 includes a coil 64 capable of selectively emitting an electromagnetic field 66 for either transferring energy to the electrified vehicle 12 or receiving energy from the electrified vehicle 12. Thus, the charging modules 62 may act as receiver or transmitter devices. An inductive roadway interface 65 of the inductive roadway 54 is configured to communicate with the electrified vehicle 12 for controlling operation of the charging modules 62 to either send electrical energy to the electrified vehicle 12 or receive electrical energy from the electrified vehicle 12.

The electrified vehicle 12 includes an inductive charging system 68 having a coil 70 adapted to communicate with the coils 64 of the charging modules 62 of the inductive roadway 54 via electromagnetic induction. The coil 70 of the inductive charging system 68 is capable of emitting an electromagnetic field 76 for either receiving energy from the inductive roadway 54 or transferring energy to the inductive roadway 54. Thus, like the charging modules 62, the inductive charging system 68 may act as a receiver or a transmitter device.

As the electrified vehicle 12 travels along the inductive roadway 54, the coil 70 of the inductive charging system 68 may be maneuvered into relatively close proximity to the coil 64 of one or more of the charging modules 62 so that power can be transmitted between the electrified vehicle 12 and the inductive roadway 54. In this disclosure, the term "inductive roadway event" indicates an event in which the electrified vehicle 12 is traveling along the inductive roadway 54 and is either accepting electrical energy from the inductive roadway 54 or sending electrical energy to the inductive roadway 54.

The electrified vehicle 12 includes a vehicle system 56 configured to communicate with both the inductive roadway 54 and the electrical grid 58 in a manner that influences the electrical grid 58. For example, it may be desirable to balance the energy production of the electrical grid 58 with the energy demanded of the electrical grid 58 by consumers. Thus, as further detailed below, operation of a power source 55 of the electrified vehicle 12 may be selectively controlled in a manner that influences the electrical grid 58 during an inductive roadway event.

The various components of the vehicle system 56 are shown schematically to better illustrate the features of this disclosure. These components, however, are not necessarily depicted in the exact locations where they would be found in an actual vehicle.

In a non-limiting embodiment, the exemplary vehicle system 56 includes the power source 55, a high voltage battery pack 57, the inductive charging system 68 and a control system 60. The power source 55 may be an engine, such as an internal combustion engine, a fuel cell, or any other device capable of generating electricity. The battery pack 57 may include one or more battery assemblies each having a plurality of battery cells or other energy storage devices. The energy storage devices of the battery pack 57 store electrical energy that is selectively supplied to power various electrical loads residing onboard the electrified vehicle 12. These electrical loads may include various high voltage loads (e.g., electric machines, etc.) or various low voltage loads (e.g., lighting systems, low voltage batteries, logic circuitry, etc.). The energy storage devices of the battery pack 57 are configured to either accept energy received by the inductive charging system 68 from the inductive roadway 54 or add energy to the inductive roadway 54, as described further below.

The inductive charging system 68 may be equipped with power electronics configured to convert AC power received from the inductive roadway 54, and thus from the electrical grid 58, to DC power for charging the energy storage devices of the battery pack 57, or for converting the DC power received from the battery pack 57 to AC power for adding energy to the electrical grid 58. The inductive charging system 68 may also be configured to accommodate one or more conventional voltage sources.

The control system 60 of the vehicle system 56 may control operation of the power source 55 during certain conditions to balance the electrical grid 58. For example, as further discussed below, the control system 60 may adjust operation of the power source 55 to either conserve a state of charge (SOC) of the battery pack 57 or deplete the SOC of the battery pack 57 during an inductive roadway event depending on the state of the electrical grid 58. The power source 55 of the electrified vehicle 12 may be commanded ON (e.g., the power output may be increased or the run time may be increased) and its associated actuators adjusted during the inductive roadway event if the electrical grid 58 has an energy shortage. The battery pack 57 SOC is therefore conserved during the drive event for adding energy to the electrical grid during the inductive roadway event. The operation of the power source 55 may alternatively be restricted (e.g., the power output is decreased or the run time is decreased) and its associated actuators adjusted during the inductive roadway event if the electrical grid 58 has an energy surplus. The battery pack 57 SOC is therefore depleted during the inductive roadway event and can be replenished by accepting energy from the electrical grid 58 during a subsequent portion of the inductive roadway event. The control system 60 may additionally control various other operational aspects of the electrified vehicle 12.

The control system 60 may be part of an overall vehicle control system or could be a separate control system that communicates with the vehicle control system. The control system 60 may include one or more control modules 78 equipped with executable instructions for interfacing with and commanding operation of various components of the vehicle system 56. For example, in one non-limiting embodiment, each of the power source 55, the battery pack 57 and the inductive charging system 68 include a control module, and these control modules can communicate with one another over a controller area network (CAN) to control the electrified vehicle 12. In another non-limiting embodiment, each control module 78 of the control system 60 includes a processing unit 72 and non-transitory memory 74 for executing the various control strategies and modes of the vehicle system 56. One exemplary control strategy is further discussed below with reference to FIG. 3.

The control system 60 of the electrified vehicle 12 may communicate with the electrical grid 58 over a cloud 80 (i.e., the internet). Upon an authorized request, a wireless grid signal 82 may be transmitted to the control system 60. The wireless grid signal 82 includes instructions for controlling the electrified vehicle 12 in order to balance the electrical grid 58 during an inductive roadway event. These instructions may be based, at least in part, on whether the electrical grid 58 is likely to experience an energy shortage or an energy surplus during the inductive roadway event. In one non-limiting embodiment, the wireless grid signal 82 instructs the control system 60 to adjust the operation of the power source 55 during the inductive roadway event to either conserve/increase the SOC of the battery pack 57 (e.g., to anticipate SOC depletion if energy shortage conditions are expected) or deplete the SOC of the battery pack 57 (e.g., to anticipate SOC increase if energy surplus conditions are expected).

The wireless grid signal 82 may be communicated via a cellular tower 84 or some other known communication technique. The control system 60 includes a transceiver 86 for bidirectional communication with the cellular tower 84. For example, the transceiver 86 can receive the wireless grid signal 82 from the electrical grid 58 or can communicate data back to the electrical grid 58 via the cellular tower 84. Although not necessarily shown or described in this highly schematic embodiment, numerous other components may enable bidirectional communication between the electrified vehicle 12 and the electrical grid 58.

The control system 60 may additionally communicate with the inductive roadway interface 65 of the inductive roadway 54. In one non-limiting embodiment, the control system 60 can communicate information to the inductive roadway interface 65 for coordinating the exchange of energy between the charging modules 62 and the inductive charging system 68. This information may include but is not limited to vehicle identification data, vehicle location data, vehicle direction and velocity data and charging data including requested power, maximum charging power, maximum discharge power, etc. The control system 60 is equipped with all necessary hardware and software for achieving bidirectional communication with both the electrical grid 58 and the inductive roadway 54.

Figure 3:
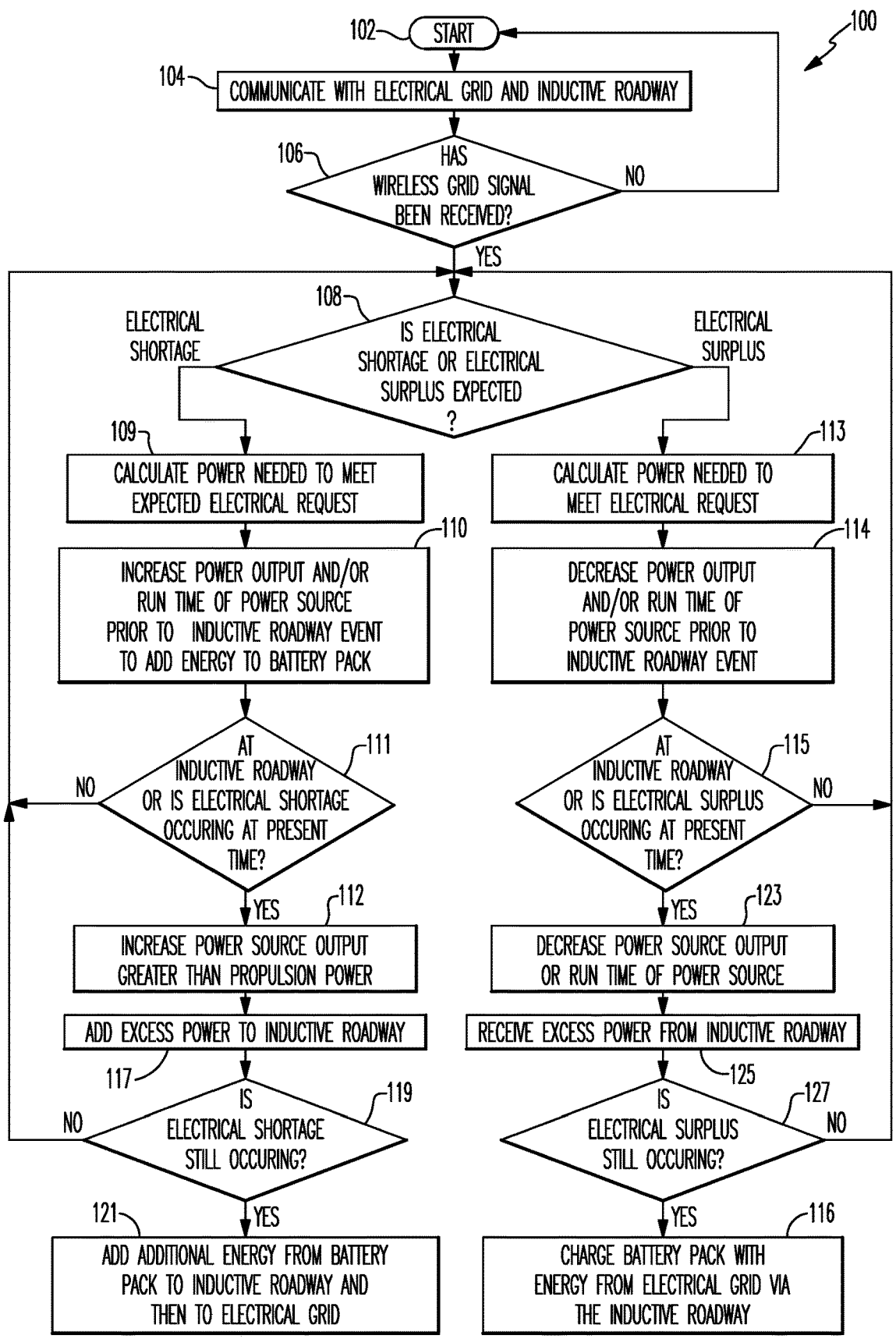
FIG. 3 schematically illustrates a control strategy for controlling an electrified vehicle in a manner that aids in balancing an electrical grid while traveling along an inductive roadway.

FIG. 3, with continued reference to FIGS. 1 and 2, schematically illustrates a control strategy 100 for controlling the vehicle system 56 of the electrified vehicle 12. For example, the control strategy 100 can be performed to control operation of the electrified vehicle 12 in a manner that balances the electrical grid 58 during an inductive roadway event. In one non-limiting embodiment, the control system 60 of the vehicle system 56 is programmed with one or more algorithms adapted to execute the exemplary control strategy 100, or any other control strategy. In another non-limiting embodiment, the control strategy 100 is stored as executable instructions in the non-transitory memory 74 of the control module 78 of the control system 60.

The control strategy 100 begins at block 102. At block 104, the electrified vehicle 12 communicates with the electrical grid 58 and the inductive roadway 54. Vehicle data associated with the electrified vehicle 12 is collected by the control system 60 and may be communicated to both the electrical grid 58 and the inductive roadway interface 65. The vehicle data may include expected drive routes of the electrified vehicle 12, current and expected SOC's of the battery pack 57, charging information, and any other relevant vehicle information. The vehicle data can optionally be used by the electrical grid 58 and/or the inductive roadway interface 65 to schedule inductive charging events during the inductive roadway event in a manner that influences the electrical grid 58.

The control system 60 of the electrified vehicle 12 determines whether a wireless grid signal 82 has been received from the electrical grid 58 at block 106. The electrical grid 58 may predict whether it is likely to have an energy shortage or an energy surplus at any given date, day and time. These predictions may be based on expected energy demand that may fluctuate based on conditions such as weather affecting the demand for household A/C usage; and compared to, expected energy production from renewable sources, to determine opportunities to optimize the usage and storage of renewable energy in connection with a vehicle battery. The renewable production sources may vary based on sun and wind forecasts. Furthermore, the total energy production of renewable and fossil fuel is compared to the demand to determine if storing or using more vehicle battery can be used to balance transient grid imbalances rather than employing additional low-efficiency gas generators. The wireless grid signal 82 is based on these predictions and includes instructions for controlling the electrified vehicle 12 to balance the electrical grid 58.

Next, at block 108, the wireless grid signal 82 is analyzed by the control system 60 to determine whether the electrical grid 58 anticipates an energy shortage or an energy surplus during the next expected inductive roadway event of the electrified vehicle 12. If an energy shortage is expected, the control strategy 100 proceeds to block 109 by calculating the power needed to meet the electrical request of the electrical grid 58 (e.g., power needed=electrical power requested+ immediate vehicle propulsion power). Next, at block 110, the control system 60 actuates the power source 55 ON so that the power source 55 powers the electrified vehicle 12 instead of the battery pack 57. This may include increasing the power output and/or increasing the run time of the power source 55 if the power source 55 is already running. In this way, the SOC of the battery pack 57 is conserved during the inductive roadway event. In another non-limiting embodiment, the power output of the power source 55 can be controlled during block 110 to generate a greater amount of power than is necessary to propel the electrified vehicle 12 to charge the battery pack 57 to a greater SOC during certain grid conditions, such as extreme grid shortages. After confirming whether the electrified vehicle 12 is still traveling on an inductive roadway or confirming that the electrical shortage is still occurring at block 111, the power output of the power source 55 is increased to greater than the propulsion power required to propel the electrified vehicle 12 at block 112. Excess power can be added to the inductive roadway at block 117. The control strategy 100 can then yet again confirm that an electrical shortage is occurring at block 119.

The conserved energy of the battery pack 57 may then be added to the electrical grid 58 to address the energy shortage at block 121 during the inductive roadway event. This may occur by first transferring the electrical energy from the battery pack 57 to the inductive charging system 68, which sends the energy to one or more of the charging modules 62 of the inductive roadway 54. Once received by the inductive roadway 54, the energy can be added to the electrical grid 58.

Alternatively, if an energy surplus is expected at block 108, the power needed to meet the electrical request of the electrical grid is determined at block 113. The control strategy 100 then proceeds to block 114 and minimizes operation of the power source prior to the inductive roadway event so that the battery pack 57 primarily powers the electrified vehicle 12. In this way, the SOC of the battery pack 57 is depleted during the inductive roadway event. After confirming whether the electrified vehicle 12 is still traveling on an inductive roadway or confirming the electrical surplus again at block 115, the power output or the run time of the power source 55 is decreased at block 123. Excess power can then be received from the inductive roadway at block 125. The control strategy 100 can then yet again confirm that an electrical surplus is occurring at block 127. Finally, the battery pack 57 can be charged with power received by the inductive charging system 68 from the charging modules 62 of the inductive roadway 54, which is first communicated from the electrical grid 58 to the inductive roadway 54, to address the energy surplus at block 116.

Figure 4:
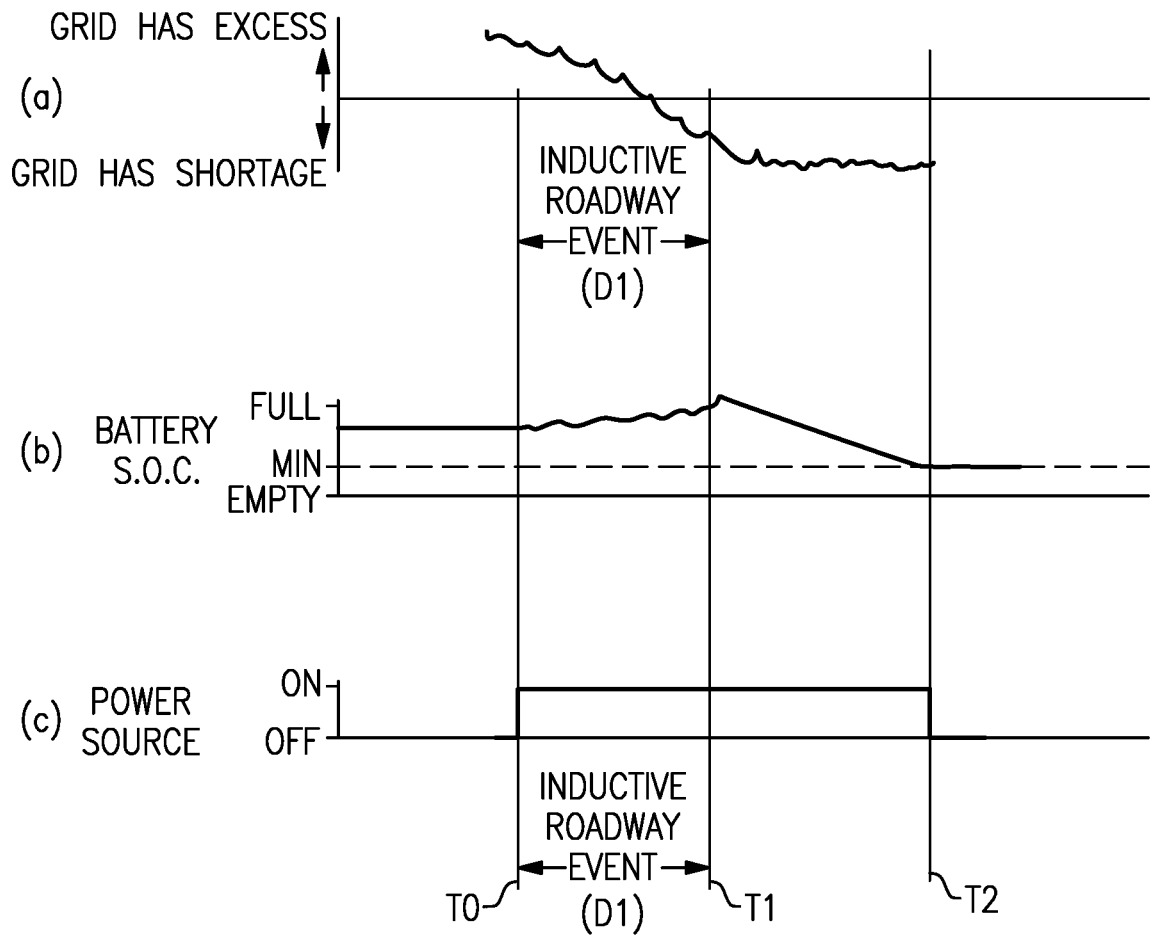
FIGS. 4 and 5 schematically illustrate exemplary implementations of the control strategy of FIG. 3.
Figure 5:
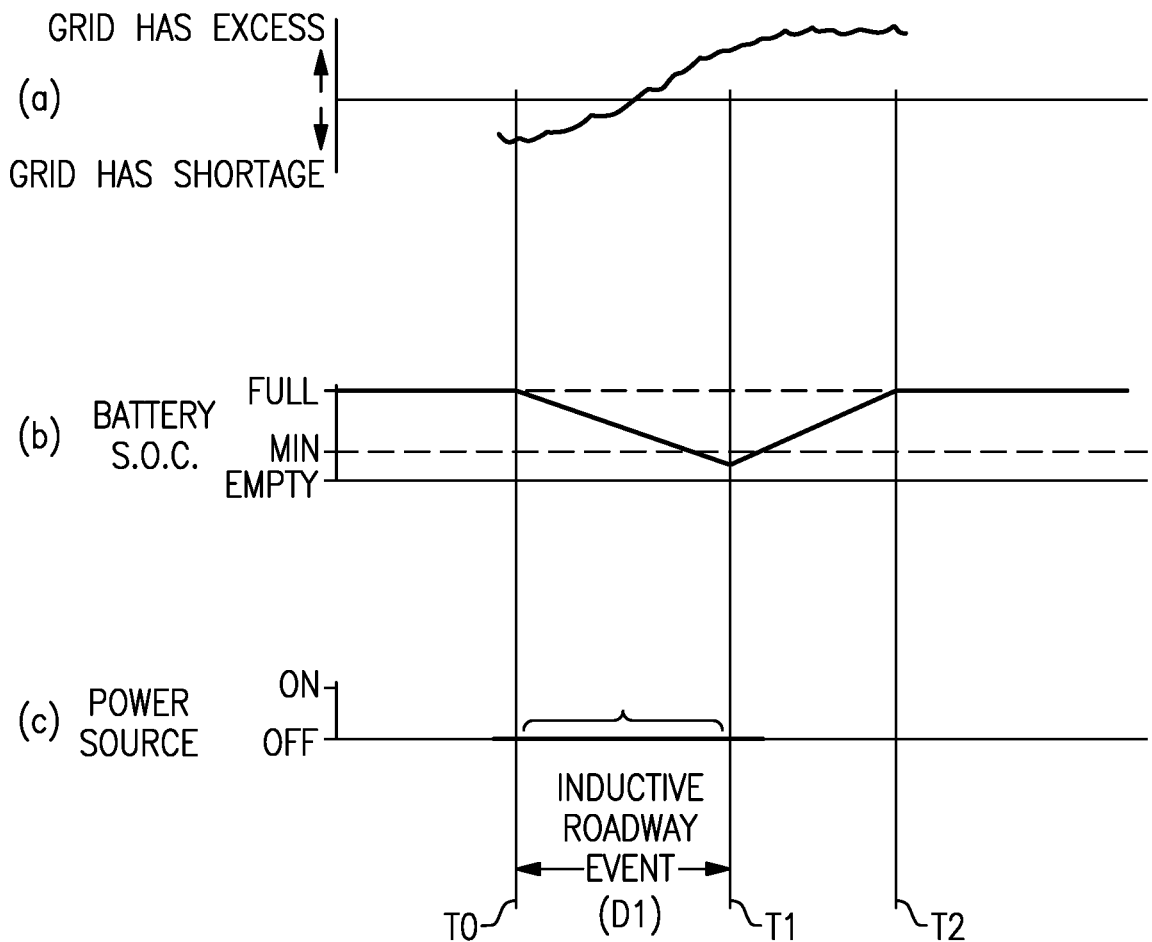

FIGS. 4 and 5 graphically illustrate exemplary implementations of the control strategy 100 described by FIG. 3. These examples are provided for illustrative purposes only, and therefore, the specific values and parameters indicated in these figures are not intended to limit this disclosure in any way.

FIG. 4 illustrates a first grid condition in which an electrical grid shortage is expected at a time T1 of the next expected inductive roadway event of the electrified vehicle 12 (see graph (a)). To address such a shortage, the power source 55 of the electrified vehicle 12 is commanded ON (see graph (c)) at time T0, which marks the beginning of an inductive roadway event D1, to conserve the SOC of the battery pack 57 during the inductive roadway event D1. The battery pack 57 SOC stays relatively consistent during the inductive roadway event D1 (see graph (b)). Therefore, during a time period between the time T1 and a time T2, the electrical grid 58 is able to draw power from the battery pack 57, through the interface with the inductive roadway 54, to help balance the electrical grid 58 (see graph (b)).

FIG. 5 illustrates a second grid condition in which an electrical grid surplus is expected at the time T1 of the next expected inductive roadway event D1 of the electrified vehicle 12 (see graph (a)). To address such a surplus, operation of the power source 55 of the electrified vehicle 12 is restricted during the inductive roadway event D1 and power source 55 start commands are inhibited (see graph (c)) to maximize battery pack 57 usage during the inductive roadway event D1. The battery pack 57 SOC is depleted during the inductive roadway event D1 (see graph (b)). Therefore, during a time period between the times T1 and T2, the electrical grid 58 is able to send needed power to the inductive roadway 54 which then sends the power to the electrified vehicle 12 for replenishing the SOC of the battery pack 57 to help balance the electrical grid 58 (see graph (b)).

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method for balancing electrical grid production with demand, comprising:
   controlling an electrified vehicle prior to and during an inductive roadway event in which the electrified vehicle travels along an inductive roadway to conserve a state of charge of a battery pack in response to a first grid condition of an electrical grid and deplete the state of charge of the battery pack in response to a second grid condition of the electrical grid; and
   controlling an inductive charging system of the electrified vehicle to either send electrical energy to the inductive roadway or accept electrical energy from the inductive roadway while the electrified vehicle is traveling along the inductive roadway,
   wherein when controlling the electrified vehicle and the inductive charging system, both prior to and during the inductive roadway event, the electrified vehicle is off-plug and a drive wheel of the electrified vehicle is being driven to propel the electrified vehicle.

2. The method as recited in claim 1, wherein the first grid condition is an energy shortage of the electrical grid and the second grid condition is an energy surplus of the electrical grid.

3. The method as recited in claim 2, comprising adding power from the battery pack to the electrical grid during the inductive roadway event when the electrical grid has the energy shortage.

4. The method as recited in claim 2, comprising accepting power from the electrical grid to charge the battery pack during the inductive roadway event when the electrical grid has the energy surplus.

5. The method as recited in claim 1, wherein the controlling step includes calculating an amount of power needed to meet an electrical need of the electrical grid based on whether the electrical grid anticipates an electrical shortage or an electrical surplus.

6. The method as recited in claim 1, comprising:
confirming whether a wireless grid signal has been received by the electrified vehicle from the electrical grid.

7. The method as recited in claim 6, comprising:
determining whether the wireless grid signal indicates an energy shortage or an energy surplus.

8. The method as recited in claim 7, wherein, when the wireless grid signal indicates an energy shortage, the controlling step includes:
increasing a power output of a power source or increasing a run time of the power source during the inductive roadway event.

9. The method as recited in claim 8, comprising:
adding energy from the battery pack to the inductive roadway and then from the inductive roadway to the electrical grid to address the energy shortage.

10. The method as recited in claim 7, wherein, when the wireless grid signal indicates an energy surplus, the controlling step includes:
decreasing a power output of a power source or decreasing a run time of the power source during the inductive roadway event.

11. The method as recited in claim 10, comprising:
delivering power from the electrical grid to the inductive roadway and then from the inductive roadway to the electrified vehicle to charge the battery pack during the inductive roadway event.

12. The method as recited in claim 1, comprising:
actuating a power source ON during the inductive roadway event in response to an energy shortage condition of the electrical grid.

13. The method as recited in claim 1, comprising:
decreasing a power output of a power source or decreasing a run time of the power source during the inductive roadway event in response to an energy surplus condition of the electrical grid.

14. An electrified vehicle, comprising:
a set of drive wheels;
a power source configured to selectively power said drive wheels;
a battery pack configured to selectively power said drive wheels; and
a control system configured with instructions for adjusting operation of said power source while traveling on an inductive roadway in a manner that influences an electrical grid.

15. The electrified vehicle as recited in claim 14, wherein said control system is configured to receive a wireless grid signal from said electrical grid, said wireless grid signal including said instructions.

16. The electrified vehicle as recited in claim 14, comprising an inductive charging system configured to either send electrical energy to said inductive roadway or receive electrical energy from said inductive roadway.

17. The electrified vehicle as recited in claim 14, wherein said control system is configured to run said power source during an energy shortage condition of said electrical grid and restrict operation of said power source during an energy surplus condition of said electrical grid.

18. The electrified vehicle as recited in claim 14, wherein said power source is an engine or a fuel cell.

19. A method, comprising:
increasing a power output of an engine of an electrified vehicle traveling along an inductive roadway in response to an electrical grid energy shortage;
decreasing the power output of the engine in response to an electrical grid energy surplus;
wherein increasing the power output conserves a state of charge of a battery pack of the electrified vehicle and decreasing the power output reduces the state of charge of the battery pack.

20. The method as recited in claim 1, wherein the inductive roadway event involves traveling greater than a negligible distance along the inductive roadway.

21. The method as recited in claim 1, wherein the inductive roadway includes a network of interconnected charging modules that are either embedded inside the inductive roadway or fixated overhead of the inductive roadway.

22. The method as recited in claim 1, wherein the controlling step includes:
increasing a power output of an engine of the electrified vehicle prior to the inductive roadway event in response to an electrical grid shortage; and
decreasing the power output of an engine of the electrified vehicle prior to the inductive roadway event in response to an electrical grid surplus.

23. The electrified vehicle as recited in claim 14, wherein adjusting said operation of said power source includes increasing or decreasing a run time of said power source.

24. The electrified vehicle as recited in claim 14, wherein adjusting said operation of said power source includes both increasing or decreasing a power output of said power source and increasing or decreasing a run time of said power source.

25. The method as recited in claim 1, comprising:
communicating information from a control system of the electrified vehicle to an inductive roadway interface associated with the inductive roadway during the inductive roadway event,
wherein the information includes vehicle location data, vehicle direction and velocity data, expected drive route data, and charging data.

* * * * *